US008923518B2

(12) United States Patent
Noda

(10) Patent No.: US 8,923,518 B2
(45) Date of Patent: Dec. 30, 2014

(54) KEY DISTRIBUTION SYSTEM, KEY DISTRIBUTION METHOD, AND RECORDING MEDIUM

(75) Inventor: Jun Noda, Tokyo (JP)

(73) Assignee: Nec Corporation, Tokyo (JP)

(*) Notice: Subject to any disclaimer, the term of this patent is extended or adjusted under 35 U.S.C. 154(b) by 78 days.

(21) Appl. No.: 13/882,303

(22) PCT Filed: Mar. 7, 2012

(86) PCT No.: PCT/JP2012/055834
§ 371 (c)(1),
(2), (4) Date: Apr. 29, 2013

(87) PCT Pub. No.: WO2012/132806
PCT Pub. Date: Oct. 4, 2012

(65) Prior Publication Data
US 2013/0223627 A1 Aug. 29, 2013

(30) Foreign Application Priority Data
Mar. 31, 2011 (JP) ................. 2011-077316

(51) Int. Cl.
*H04L 9/08* (2006.01)
*H04K 1/00* (2006.01)
*H04L 29/06* (2006.01)
*H04W 12/04* (2009.01)
*H04L 9/14* (2006.01)
*H04W 84/18* (2009.01)

(52) U.S. Cl.
CPC .............. *H04L 63/062* (2013.01); *H04L 9/083* (2013.01); *H04W 12/04* (2013.01); *H04L 9/14* (2014.01); *H04L 63/065* (2013.01); *H04L 2209/80* (2013.01); *H04W 84/18* (2013.01)
USPC .......................................... 380/279; 380/270

(58) Field of Classification Search
CPC .............................. H04W 84/18; H04W 12/04
USPC .................. 380/270, 277–286; 713/150, 158, 713/168–181; 340/10.1–10.6, 572.1–572.8
See application file for complete search history.

(56) References Cited

U.S. PATENT DOCUMENTS 7,181,015 B2 * 2/2007 Matt .............................. 380/279
7,486,795 B2 * 2/2009 Eschenauer et al. .......... 380/277

(Continued)

FOREIGN PATENT DOCUMENTS

JP 2001-111544 A 4/2001
WO 2006/077803 A1 7/2006

OTHER PUBLICATIONS

P. Traynor, R. Kumar, H. Choi, G. Cao, S. Zhu, and T.L. Porta, "Efficient Hybrid Security Mechanisms for Heterogeneous Sensor Networks," IEEE Trans. Mobile Computing, vol. 6, No. 6, Jun. 2007.*

(Continued)

*Primary Examiner* — Christopher Revak
*Assistant Examiner* — Vadim Savenkov
(74) *Attorney, Agent, or Firm* — Sughrue Mion, PLLC

(57) ABSTRACT

A key distribution system includes a server and terminal devices constructing an ad-hoc network and communicating with each other with information being encrypted by a key distributed from the server. The server obtains a predetermined attribute value desired as a communication counterparty by the terminal device from the terminal device, and obtains a plurality of keys corresponding to the obtained attribute values from a key managing information. The server obtains, among the plurality of obtained keys, m number of keys that maximize the posterior probability that the keys are stored in the terminal device having the same attribute value as the attribute value obtained from the terminal device and having the number of communications larger than a predetermined value, and transmits the m number of keys to the terminal device.

11 Claims, 12 Drawing Sheets

(56) References Cited

U.S. PATENT DOCUMENTS

2004/0037424 A1* 2/2004 Numao et al. ............ 380/277
2008/0159542 A1* 7/2008 Ito et al. ............ 380/279

OTHER PUBLICATIONS

D. Liu and P. Ning. "Location-based pairwise key establishments for static sensor networks," in ACM SASN, Fairfax, VA, Oct. 2003.*

S.A. Camtepe, B. Yener, Key distribution mechanisms for wireless sensor networks: a survey, Technical Report TR-05-07, Rensselaer Polytechnic Institute, Mar. 23, 2005.*

W. Du, J. Deng, Y. Han, S. Chen, and P.K. Varshney, "A key management scheme for wireless sensor networks using deployment knowledge," in IEEE INFOCOM, HongKong, China, Mar. 2004.*

Donggang Liu, et al., "Group-Based Key Pre-Distribution in Wireless Sensor Networks", Proceedings of the 4th ACM Workshop on Wireless Security, Sep. 2, 2005, pp. 11-20.

Ikumi Mori, et al., "The Study of Common-key Secret Sharing Method in Ad-hoc Networks", IPSJ SIG Notes, Jan. 22, 2009, pp. 25-32, vol. 2009, No. 8.

Tetsuo Funayama, "Efficient Key Distribution System Using Communication Probability", IPSJ SIG Notes, May 12, 2006, pp. 1-6, vol. 2006, No. 43.

Shingo Kagami, et al., "Sensor Fusion—An Architectural Perspective on Information Processing in Sensor Networks", The Transactions of the Institute of Electronics, Information and Communication Engineers A, Dec. 1, 2005, pp. 1404-1412, vol. J88-A, No. 12.

* cited by examiner

FIG. 4

| NUMBER-OF-COMMUNICATION DB | | 112 |
|---|---|---|
| TERMINAL DEVICE 400 | | |
| TERMINAL DEVICE 300 | | |
| TERMINAL DEVICE 200 | | |

| KEY ID | NUMBER OF COMMUNICATIONS |
|---|---|
| 11_1 | 10 |
| 11_2 | 40 |
| ⋮ | ⋮ |
| 11_n | 50 |
| 12_1 | 5 |
| ⋮ | ⋮ |
| 12_n | 20 |
| ⋮ | ⋮ |

FIG. 5

ATTRIBUTE INFORMATION DB

|  | ATTRIBUTE | | |
| --- | --- | --- | --- |
|  | POSITION | FUNCTION | OWNER |
| TERMINAL DEVICE 200 | AREA A11 | ... | ... |
| TERMINAL DEVICE 300 | AREA A21 | ... | ... |
| TERMINAL DEVICE 400 | AREA A11 | ... | ... |

FIG. 7

KEY DB

| KEY ID | KEY |
|---|---|
| 11_1 | K11_1 |
| 11_3 | K11_3 |
| ⋮ | ⋮ |
| 11_35 | K11_35 | m NUMBER {

FIG. 8

NUMBER-OF-COMMUNICATION DB

| KEY ID | NUMBER OF COMMUNICATIONS |
|---|---|
| 11_1 | 10 |
| 11_2 | 40 |
| ⋮ | ⋮ |
| 11_n | 50 |
| 12_1 | 5 |
| ⋮ | ⋮ |
| 12_n | 20 |
| ⋮ | ⋮ |

KEY DISTRIBUTION SYSTEM, KEY DISTRIBUTION METHOD, AND RECORDING MEDIUM

CROSS REFERENCE TO RELATED APPLICATIONS

This application is a National Stage of International Application No. PCT/JP2012/055834, filed on Mar. 7, 2012, which claims priority from Japanese Patent Application No. 2011-077316, filed on Mar. 31, 2011, the contents of all of which are incorporated herein by reference in their entirety.

TECHNICAL FIELD

The present invention relates to a key distribution system including a plurality of wireless-communication terminal devices, and a server that distributes, to the wireless-communication terminal devices, a key for encrypting information exchanged among the wireless-communication terminal devices over an ad-hoc network, a key distribution method, and a recording medium.

BACKGROUND ART

Ad-hoc networks are getting attention as a scheme of establishing a flexible network by a mobile terminal at the location thereof. Ad-hoc networks are based on an assumption that a network is closed between terminals through a close-range communication as much as possible during a communication. Example close-range communications are ZigBee, Bluetooth (registered trademark), UWB (Ultra Wide Band), and RFID (Radio Frequency Identification). Those are classified in a wireless PAN (Personal Area Network) specification in a point that a communication range is relatively short although there are differences from each other in a communication speed and a power consumption.

When an ad-hoc network is used, a terminal possessed by, for example, a child, an elder person, or a disability person transmits personal information to the effect that such a person has a disadvantage in the age or a leg to terminals buried around a town, a barrier-free environment can be realized. A barrier-free environment means an environment such that the stages of store shelves are ascended or descended as needed, and a product is disposed so that a person can easily reach. Information exchanged at this time contains a large amount of privacy information. Hence, it is necessary to safely protect a communication through an information security like an encryption.

It is not always true that a manager (server) responsible for a network management including a security securement with each mobile terminal is capable of communication on a steady basis. That is, an opportunity at which the manager is capable of communication is sometimes limited to an opportunity at which a certain infrastructure is available such that a hot spot is available. Hence, in order to realize a safe communication through an ad-hoc network, it is necessary for each mobile terminal to have necessary security setting done in advance in an opportunity at which such a mobile terminal is capable of communicating with the server. A simplest scheme of realizing such a security setting is to cause respective mobile terminals to have one common key shared over the network. According to this scheme, however, when the common key is leaked from just one terminal in the network, the communication becomes vulnerable.

With respect to such a disadvantage, Patent Literature 1 discloses a method of causing a pair of communicating terminals to store a key in advance, thereby accomplishing a safe communication. Moreover, Patent Literature 2 discloses a method of causing a terminal and another terminal to share a key at a high probability under a condition in which another terminal is surely present near the former terminal.

PRIOR ART LITERATURE

Patent Literatures

Patent Literature 1: Unexamined Japanese Patent Application Kokai Publication No. 2001-111544
Patent Literature 2: WO 2006/077803 A

DISCLOSURE OF THE INVENTION

Problem to be Solved by the Invention

According to the method disclosed in Patent Literature 1, however, when all terminals can store those keys in advance, a safe communication between arbitrary terminals is enabled, but when those terminals have a limited memory capacity, it becomes difficult for all terminals to store all keys. Accordingly, a safe communication between arbitrary terminals becomes difficult.

Moreover, according to the method disclosed in Patent Literature 2, however, it is effective for a communication between terminals stationary placed in an environment, but when a change in the position together with a movement occurs such that the target is a mobile terminal, there is a possibility that a safe communication path cannot be established using the set key. Furthermore, according to the method disclosed in Patent Literature 2, it is incompatible with a preferential establishment of a safe communication path with a terminal other than adjacent terminals like a terminal having an attribute desired by a user, for example, a terminal having a predetermined function and a terminal possessed by a predetermined user.

The present invention has been made in view of such disadvantages, and it is an objective of the present invention to provide a key distribution system, a key distribution method and a recording medium that can establish a safe communication path between terminal devices over an ad-hoc network with a little memory capacity.

Means for Solving the Problem

To accomplish the above objective, a key distribution system according to a first aspect of the present invention is a key distribution system that includes: a plurality of wireless communication terminal devices that includes a first wireless communication terminal device and a second wireless communication terminal device constructing an ad-hoc network; and a server that distributes, to the plurality of wireless communication terminal devices, a key for encrypting information transmitted by the plurality of wireless communication terminal devices with each other over the ad-hoc network, the first wireless communication terminal device including an attribute value transmitter that transmits an attribute value of the second wireless communication terminal device to the server, and the server including: a key managing information storage that stores attribute values of the plurality of wireless communication terminal devices and a plurality of keys in association with each other; and a key distributer which obtains, from the key managing information storage, a plurality of keys corresponding to an attribute value transmitted by the attribute value transmitter, obtains a predetermined number of keys maximizing a posterior probability of, among the plurality of obtained keys, the key being stored in a plurality of wireless communication terminal devices having a same attribute value as the attribute value transmitted by the attribute value transmitter and having a communication repetition larger than a predetermined value among the plurality of wireless communication terminal devices, and transmits the predetermined number of obtained keys to the first wireless communication terminal devices.

To accomplish the above objective, a key distribution method according to a second aspect of the present invention is a key distribution method for distributing a key for encrypting information transmitted by a plurality of wireless communication terminal devices with each other over an ad-hoc network, to the plurality of wireless communication terminal devices including a first wireless communication terminal device and a second wireless communication terminal device, the method including steps of: obtaining, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device; obtaining, among the plurality of keys obtained through the step of obtaining the plurality of keys, a predetermined number of keys that maximize a posterior probability that the keys are stored in a plurality of wireless communication terminal devices having a same attribute value as the attribute value of the second wireless communication terminal device and having a communication repetition larger than a predetermined value; and transmitting the predetermined number of keys obtained through the step of obtaining the predetermined number of keys to the first wireless communication terminal device.

To accomplish the above objective, a recording medium according to a third aspect of the present invention is a recording medium having stored therein a program executed by a computer that distributes a key for encrypting information transmitted by a plurality of wireless communication terminal devices with each other over an ad-hoc network, to the plurality of wireless communication terminal devices including a first wireless communication terminal device and a second wireless communication terminal device, the program causing the computer to function as: an attribute-value-corresponding-key obtainer that obtains, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device; a predetermined-number-of-key obtainer that obtains, among the plurality of keys obtained by the attribute-value-corresponding-key obtainer, a predetermined number of keys that maximize a posterior probability that the keys are stored in a plurality of wireless communication terminal devices having a same attribute value as the attribute value of the second wireless communication terminal device and having a communication repetition larger than a predetermined value; and a key transmitter that transmits the predetermined number of keys obtained by the predetermined-number-of-key obtainer to the first wireless communication terminal device.

Effects of the Invention

According to the present invention, there are provided a key distribution system, a key distribution method and a recording medium that can establish a safe communication path between terminal devices over an ad-hoc network with a little memory capacity.

BRIEF DESCRIPTION OF DRAWINGS

FIG. 4 is an exemplary diagram illustrating an example number-of-communication DB of a server;

FIG. 5 is an exemplary diagram illustrating an example attribute information DB;

FIG. 7 is an exemplary diagram illustrating an example key DB;

FIG. 8 is an exemplary diagram illustrating an example number-of-communication DB of a terminal device;

MODE FOR CARRYING OUT THE INVENTION

Embodiment

An explanation will be below given of a key distribution system 1 according to an embodiment of the present invention with reference to the accompanying drawings.

Figure 1:
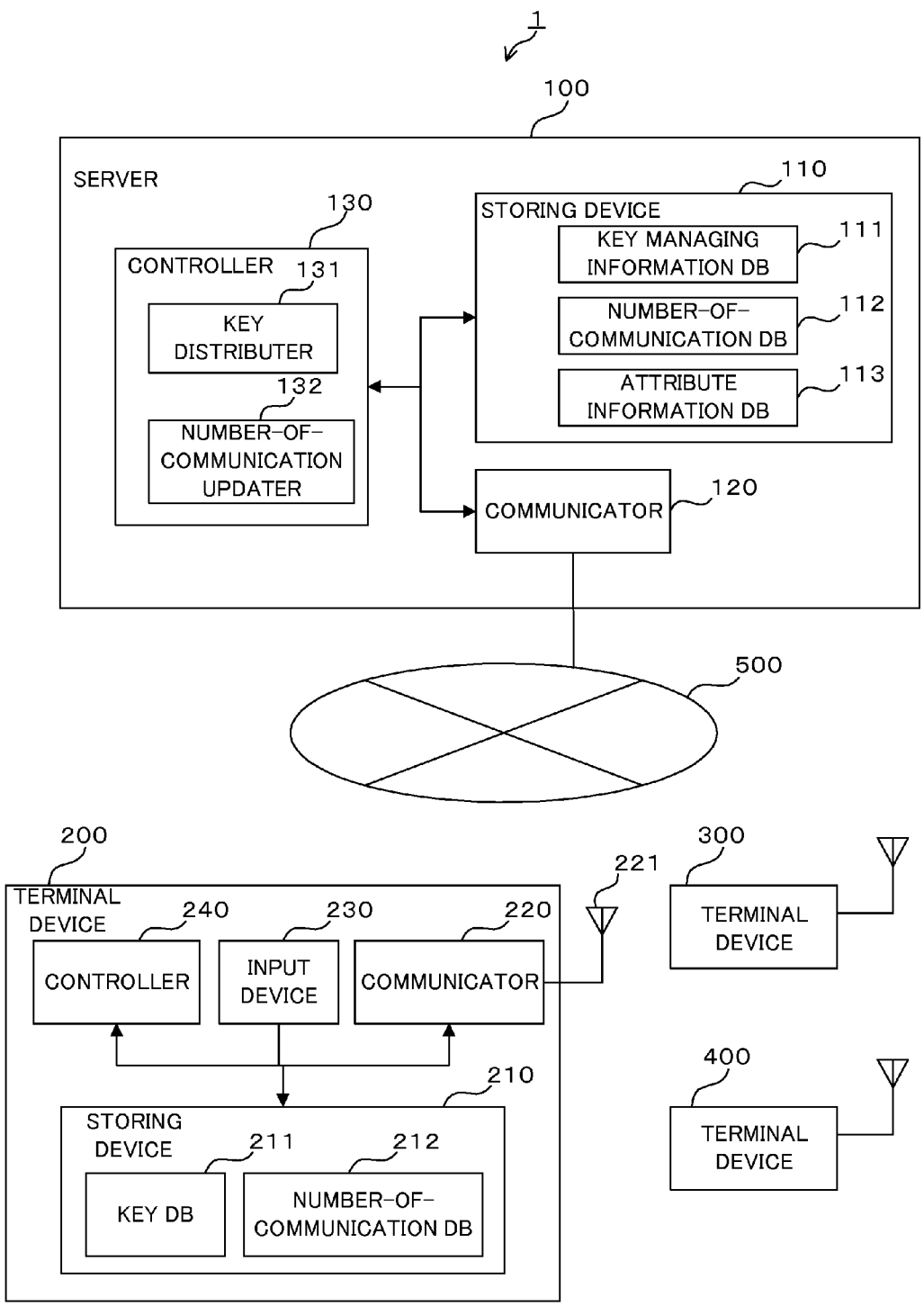
FIG. 1 is a block diagram illustrating an example structure of a key distribution system according to an embodiment of the present invention.

FIG. 1 illustrates a structure of a key distribution system 1 according to an embodiment of the present invention. This key distribution system 1 includes a server 100 and a plurality of terminal devices 200 to 400. The server 100 and the terminal devices 200 to 400 are connected via a network 500. Moreover, the respective terminal devices 200 to 400 construct an ad-hoc network therebetween through an autonomous decentralized wireless communication.

The network 500 is a communication network like a LAN (Local Area Network) based on a predetermined communication protocol like TCP/IP (Transmission Control Protocol/Internet Protocol).

The server 100 is an information processing device like a personal computer or a work station. The server 100 includes a storing device 110, a communicator 120, and a controller 130.

The storing device 110 is a storage device like a hard disk device, and stores operation programs run by the controller 130, temporal data produced through a key distributing process to be discussed later, and various data applied in the key distributing process.

Moreover, as illustrated in FIG. 1, the storing device 110 includes a key managing information database (DB) 111, a number-of-communication DB 112, and an attribute information DB 113.

Figure 2:
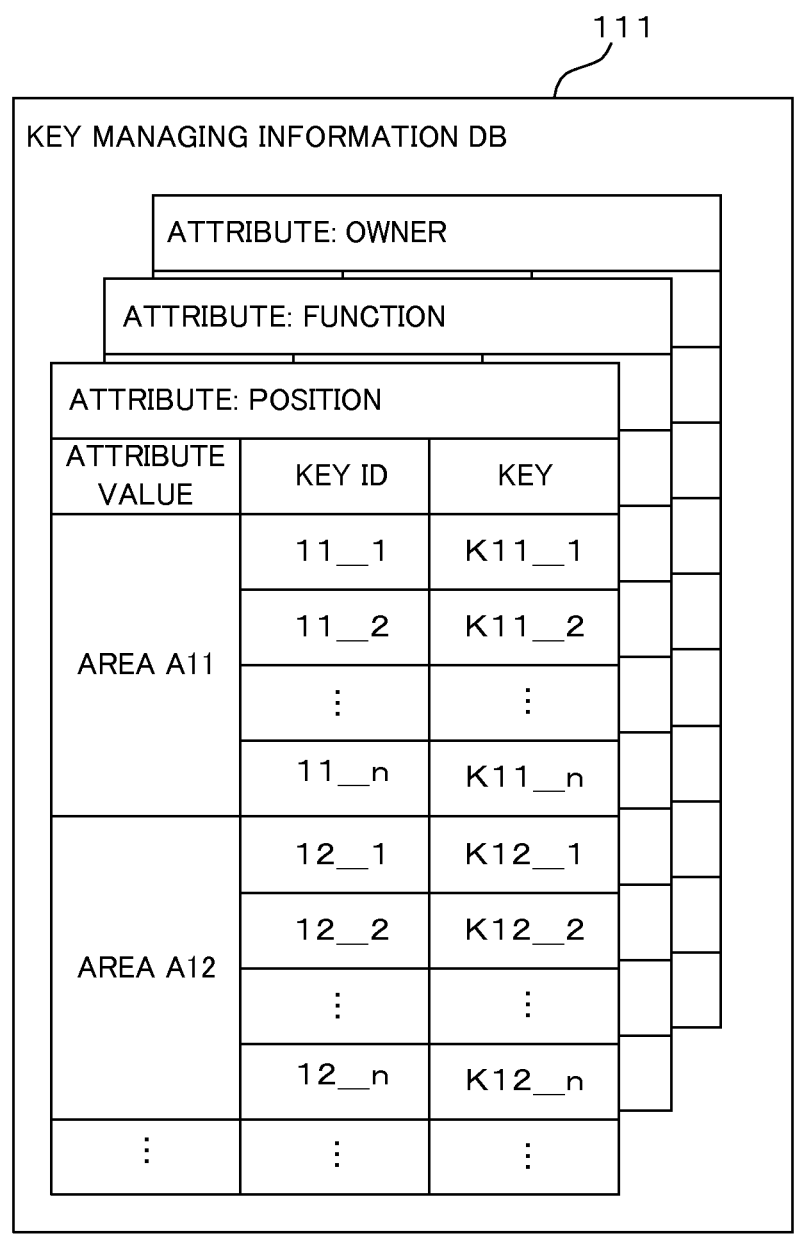
FIG. 2 is an exemplary diagram illustrating an example key managing information DB.

The key managing information DB 111 stores "key managing information" that is information for managing a key to be distributed to the terminal devices 200 to 400. As illustrated in FIG. 2, the key managing information contains "attribute", "attribute value", "key ID", and "key".

The "attribute" indicates various attributes of the terminal devices 200 to 400. Example attributes are "position" indicating the positions of the terminal devices 200 to 400, "function" indicating the functions of the terminal devices 200 to 400, and "owner" indicating the owners of the terminal devices 200 to 400. Moreover, the "attribute value" indicates the attribute value of the attribute.

Figure 3:
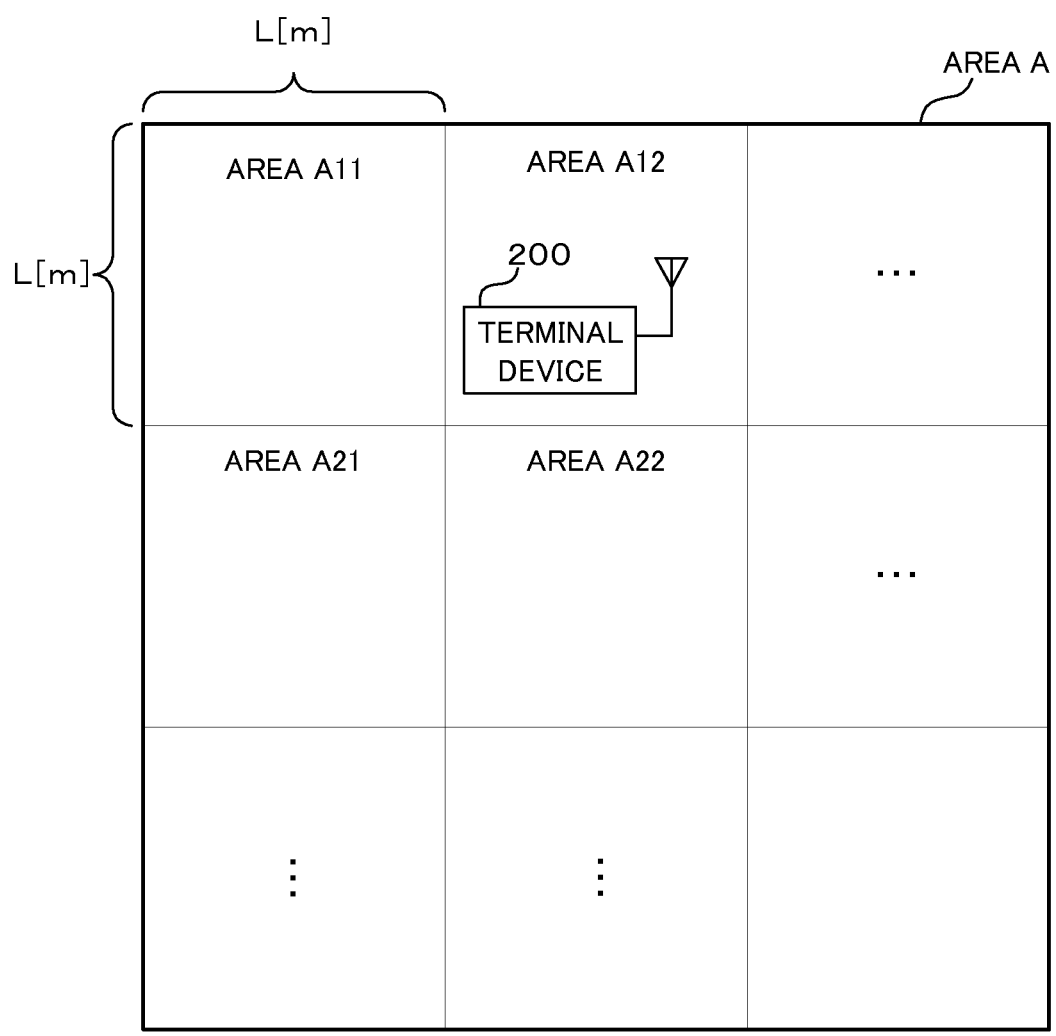
FIG. 3 is a diagram for explaining an attribute value when an attribute is "position"

An explanation will be given of an example "attribute value" when the "attribute" is "position" with reference to FIG. 3. As illustrated in FIG. 3, an area A is divided into grids each having a length of a side of a block that is a predetermined length L [m] (for example, several hundreds [m] to several kilo [m]). Next, each block of the divided area A is associated like "area A11", "area A12" that are the "attribute value" indicating the positions of the terminal devices 200 to 400 when the "attribute" is "position". More specifically, when the terminal device 200 is in a position illustrated in FIG. 3, the attribute value of the "position" of the terminal device 200 is "area A12".

The "key ID" is identification information allocated to the key distributed to the terminal devices 200 to 400. The "key" is an encryption key when the terminal devices 200 to 400 communicate with each other over an ad-hoc network. As illustrated in FIG. 2, n number of keys and key IDs are stored in association with each other for each attribute value.

The number-of-communication DB 112 stores number-of-communication information indicating a number of communications performed using the key stored in the key managing information DB 111 for each of the terminal devices 200 to 400. As illustrated in FIG. 4, the number-of-communication information contains a key ID, and a number of communications performed using this key ID for each terminal device 200 to 400. The number-of-communication DB 112 is updated through a number-of-communication updating process to be discussed later.

The attribute information DB 113 stores the attribute value of each attribute for each terminal device 200 to 400. More specifically, as illustrated in FIG. 5, as an example case, the attribute information DB 113 stores the attribute values that are "position", "function", and "owner" for each terminal device 200 to 400. The attribute value of each attribute stored in the attribute information DB 113 may be set in advance, or may be updated upon reception of the latest attribute value from the terminal devices 200 to 400 for each predetermined time. For example, as an attribute value of "position", the position information of the terminal devices 200 to 400 transmitted to the server when, for example, the user obtains the map around the current position of the terminal devices 200 to 400 so as to utilize a service using positional information of the terminal devices 200 to 400 may be stored in the attribute information DB 113.

The communicator 120 is, for example, a communication device like an NIC (Network Interface Card) or a router. The communicator 120 connects the server 100 with the network 500, and communicates with the terminal devices 200 to 400 via the network 500.

The controller 130 includes, for example, a CPU (Central Processing Unit), and a RAM (Random Access Memory) serving as a work area. The controller 130 reads operation programs (for example, an operating system and a key distribution program to be discussed later) stored in the storing device 110, and runs such programs. Hence, the controller 130 controls respective components of the server 100, thereby executing, for example, a key distributing process to be discussed later.

Next, an explanation will be given of a function realized by the controller 130 and a process for realizing such a function. The controller 130 serves as a key distributer 131, and a number-of-communication obtainer 132.

The key distributer 131 obtains, from the key managing information DB 111, a key highly possibly stored in a terminal device having a high frequency of communication among the terminal devices 200 to 400 having an attribute value obtained from the terminal devices 200 to 400. Next, the key distributer 131 transmits the obtained key to the terminal devices 200 to 400.

More specifically, the key distributer 131 obtains, based on the attribute value obtained from the terminal devices 200 to 400, m number of key IDs at random from the key managing information DB 111. The number m is a sufficiently smaller value than the number n of the keys associated with each attribute value in the key managing information DB 111, and is set in advance by, for example, being stored in the memory unit 110. It is preferable that the value of m should be set in accordance with the memory capacity of the terminal device 200 to 400. Moreover, the key distributer 131 refers to the attribute information DB 113, and extracts the terminal device having the same attribute value as the attribute value obtained from the terminal devices 200 to 400. Next, the key distributer 131 refers to the number-of-communication information of the extracted terminal device stored in the number-of-communication DB 112, and calculates a posterior probability $P(m)$ that the keys corresponding to the obtained m number of key IDs are stored in the terminal devices 200 to 400 having the number of communications performed using such keys larger than a predetermined value.

A specific explanation will now be given of how to calculate the posterior probability $P(m)$.

The key distributer 131 extracts, for number-of-communication information which is stored in the number-of-communication DB 112 and which is of the terminal device having the same attribute value as the attribute value obtained from the terminal device 200 to 400, a key having a number of communications corresponding to the obtained m number of key IDs larger than a predetermined value Nc as an "active key", and a key having a number of communications equal to or smaller than the predetermined value Nc as "non-active key". For example, it is presumed that the terminal device 200 has the same attribute value as the attribute value "area A11" of the attribute "position" obtained from the terminal device 400, the m number of key IDs contain "11_1" and "11_2", and the predetermined value Nc=30. In this case, in the terminal device 200, the key with the key ID "11_1" is extracted as the "non-active key" and the key with the key ID "11_2" is extracted as the "active key".

Figure 6:
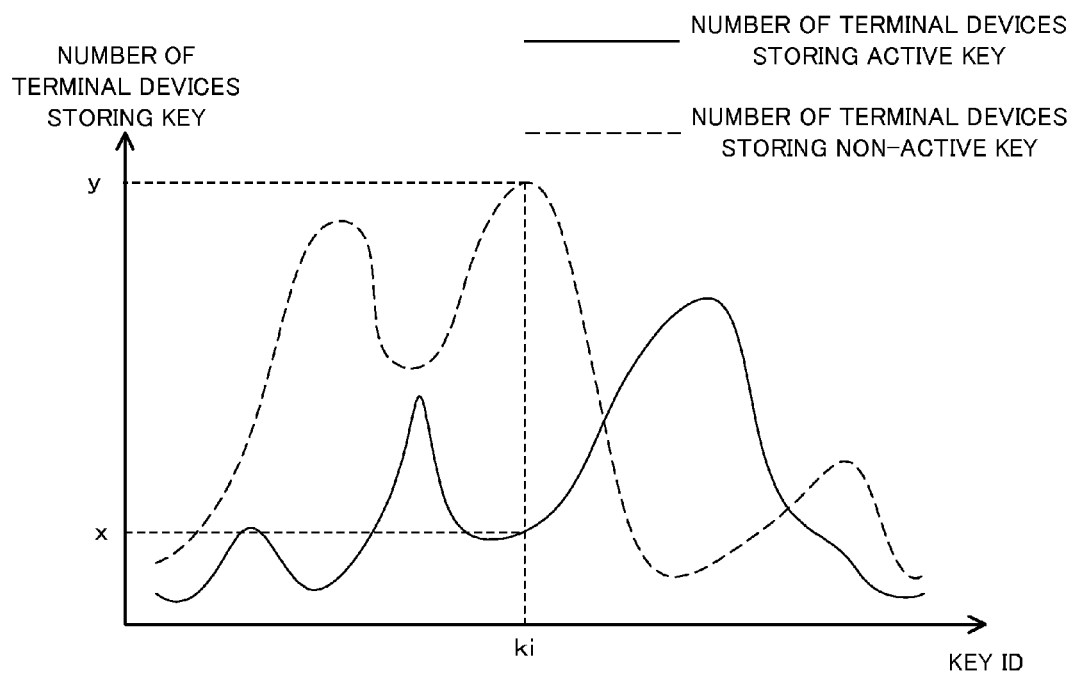
FIG. 6 is a diagram illustrating a relationship among a key ID, a number of terminal devices storing an active key, and a number of terminal devices storing inactive key.

FIG. 6 illustrates a relationship among the m number of key IDs, the number of terminal devices storing the keys corresponding to those key IDs as "active keys", and the number of terminal devices storing the keys corresponding to those key IDs as "non-active keys". It is presumed that the obtained m number of key IDs are k1, k2, k3, . . . , and km, respectively. For example, the number of terminal devices storing the key which has the key ID that is ki and which is the "active key" is x, and the number of terminal devices storing such a key as the "non-active key" is y.

It is presumed that the probability of selecting the key with the key ID of ki among all keys is $P(ki)$, and the probability that a key is an active key is P(active) among all keys. In this case, a posterior probability P(m) can be given as the following formula.

$$P(m) = \sum_{i=1}^{m} P(\text{active} | k_i) \quad \text{[Formula 1]}$$

Furthermore, P(active|ki) can be given as the following formula based on the Bays' theorem. Note that A is a total number of the active keys, while B is a total number of the non-active keys.

$$P(\text{active} | k_i) = \frac{P(\text{active})P(k_i | \text{active})}{P(k_i)} \quad \text{[Formula 2]}$$

$$= \frac{\frac{A}{A \times B} \times \frac{x}{A}}{\frac{A}{A \times B} \times \frac{x}{A} + \frac{B}{A+B} \times \frac{y}{B}}$$

Next, the key distributer 131 records the m number of key IDs and the posterior probability P(m) in a RAM or the like in association with each other. Subsequently, the key distributer 131 obtains the m number of key IDs at random from the key managing information DB 111 explained above, and executes a process of calculating the posterior probability P(m) by predetermined times. Thereafter, the m number of key IDs and the key corresponding to the maximum posterior probability P(m) among the posterior probabilities P(m) recorded in the RAM or the like are transmitted to the terminal devices 200 to 400.

The number-of-communication updater 132 obtains the number-of-communication information from the terminal devices 200 to 400, and updates the number-of-communication DB 112.

Next, an explanation will be given of a structure of the terminal device 200 to 400. FIG. 1 illustrates the three terminal devices 200 to 400 as examples, but the number of terminal devices is not limited to such a number.

The terminal devices 200 to 400 performs communication among the terminal devices 200 to 400 over an ad-hoc network. Moreover, the terminal devices 200 to 400 communicate with the server 100 over the network 500. More specifically, the terminal devices 200 to 400 encrypt information using the key received from the server 100, and perform communication over the ad-hoc network among the terminal devices 200 to 400. The explanation will be below given of the detail of the structure of the terminal device 200, but it is presumed that the terminal devices 300 and 400 employ the same structure as that of the terminal device 200.

The terminal device 200 includes a storing device 210, a communicator 220, an input device 230, and a controller 240. Respective components are connected with each other via an internal bus.

The storing device 210 is a storage device like a hard disk, and stores necessary information for executing the key distributing process and a communication establishing process, temporal data created through those processes, and an operation program of the controller 230.

Moreover, as illustrated in FIG. 1, the storing device 210 includes a key DB 211 and a number-of-communication DB 212.

The key DB 211 stores a key received from the server 100. FIG. 7 illustrates an example key DB 211. As illustrated in FIG. 7, the key DB 211 stores m number of key IDs and the keys corresponding to those key IDs.

The number-of-communication DB 212 stores number-of-communication information indicating a number of communications performed by the terminal device 200 using the key stored in the key managing information DB 111. As illustrated in FIG. 8, the number-of-communication information contains key IDs and the number of communications performed using each key ID. The number-of-communication DB 212 is updated through a communication establishing process to be discussed later. Moreover, the number-of-communication information stored in the number-of-communication DB 212 is transmitted to the server 100 through a number-of-communication updating process to be discussed later.

The communicator 220 is, for example, a communication device like an NIC, is connected with the network through an antenna 221, and performs wireless communication with the server 100. Moreover, the communicator 220 performs wireless communication with the communicator of another terminal device through the antenna 221 over an ad-hoc network.

The input device 230 includes, for example, input means like a keyboard and a press button, receives an instruction or the like to the controller 240 input through the input means, and transmits the input instruction or the like to the controller 240.

The controller 240 includes, for example, a CPU, and a RAM serving as a work area. The controller 240 reads the operation program stored in the storing device 210, and executes the key distributing process and the communication establishing process to be discussed later.

A specific example will be given below of operations of the server 100 and the terminal devices 200 to 400 according to this embodiment with reference to the accompanying drawings.

Figure 9:
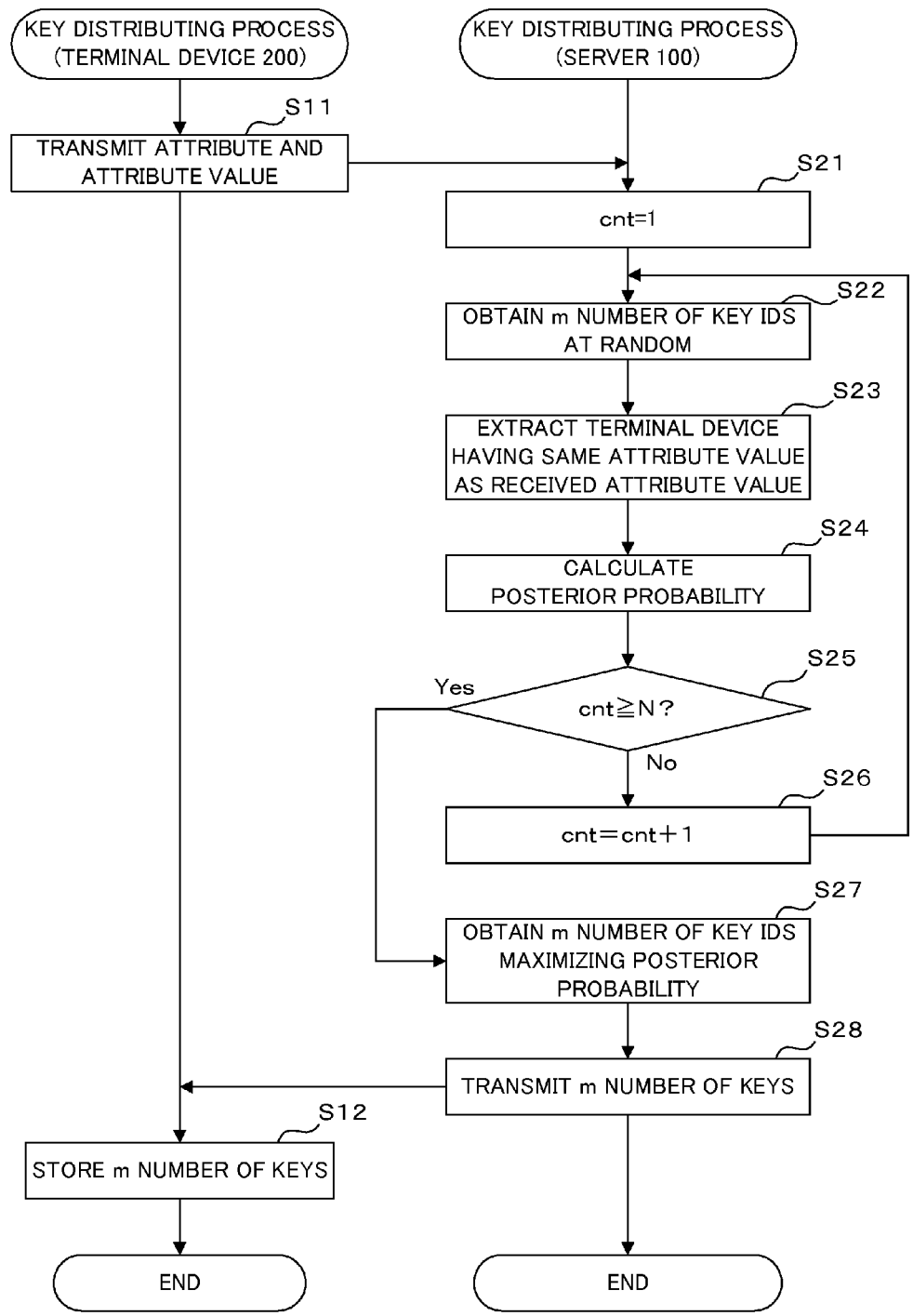
FIG. 9 is a flowchart for explaining a key distributing process executed by the server and the terminal device.

First, the key distributing process will be explained with reference to the flowchart of FIG. 9. In the following explanation, the key distributing process executed between the terminal device 200 and the server 100 will be explained, but it is presumed that the same key distributing process is performed between the terminal device 300, 400 and the server 100.

For example, the key distributing process is started upon inputting of an instruction for performing wireless communication over an ad-hoc network from the input device 230 of the terminal device 200.

The controller 240 of the terminal device 200 obtains the attribute and the attribute value, and transmits those to the server 100 (step S11). The attribute and the attribute value may be input through the input device 230 by the user of the terminal device 200. Moreover, the attribute and the attribute value stored in advance in the storing device 210 of the terminal device 200 may be transmitted to the server 100. It is suitable if the attribute and the attribute value transmitted by the terminal device 200 should be the attribute and the attribute value of the communication counterparty terminal device (for example, the terminal device 300 or the terminal device 400).

Next, the key distributer 131 of the server 100 sets a counter cnt to be 1 (step S21).

Subsequently, the key distributer 131 refers to the key managing information DB 111 based on the attribute and the attribute value transmitted by the terminal device 200 in the step S11, and obtains m number of key IDs at random (step S22). When, for example, the attribute received from the terminal device 200 is "position" and the attribute value is "area A12", the key distributer 130 refers to the key managing DB 111, and obtains m number of key IDs at random among the n number of key IDs "12_1" to "12_n".

Next, the key distributer 131 refers to the attribute information DB 113, and extracts the terminal device having the same attribute value as the attribute value received in the step S11 (step S23).

Next, the key distributer 131 refers to the number-of-communication DB 112, and calculates a posterior probability P(m) that the keys corresponding to the m number of key IDs obtained in the step S22 are stored in the terminal device having the number of communications using such keys larger than the predetermined value among the terminal devices extracted in the step S23 (step S24). More specifically, the posterior probability P(m) is calculated using the above-explained formulae 1 and 2, and the m number of key IDs and the posterior probability P(m) are recorded in the RAM in association with each other.

Next, the key distributer 131 determines whether or not the counter cnt is equal to or greater than a predetermined number of times N (step S25). When it is determined that the counter cnt is not equal to or greater than the predetermined number of times N (step S25: NO), the controller 130 adds 1 to the counter cnt (step S26), and returns the process to the step S22.

Moreover, when determining that the counter cnt is equal to or greater than the predetermined number of times N (step S25: YES), the key distributer 131 obtains m number of key IDs that maximize P(m) among the posterior probabilities P(m) recorded in the RAM (step S27).

Next, the key distributer 131 transmits the m number of key IDs obtained in the step S27 and the keys corresponding to those key IDs to the terminal device 200 (step S28).

The controller 240 of the terminal device 200 stores the m number of key IDs and the keys transmitted by the server 100 in the step S28 in the key DB 211 (step S12). Next, the controller 130 of the server 100 and the controller 240 of the terminal device 200 complete the key distributing process.

Figure 10:
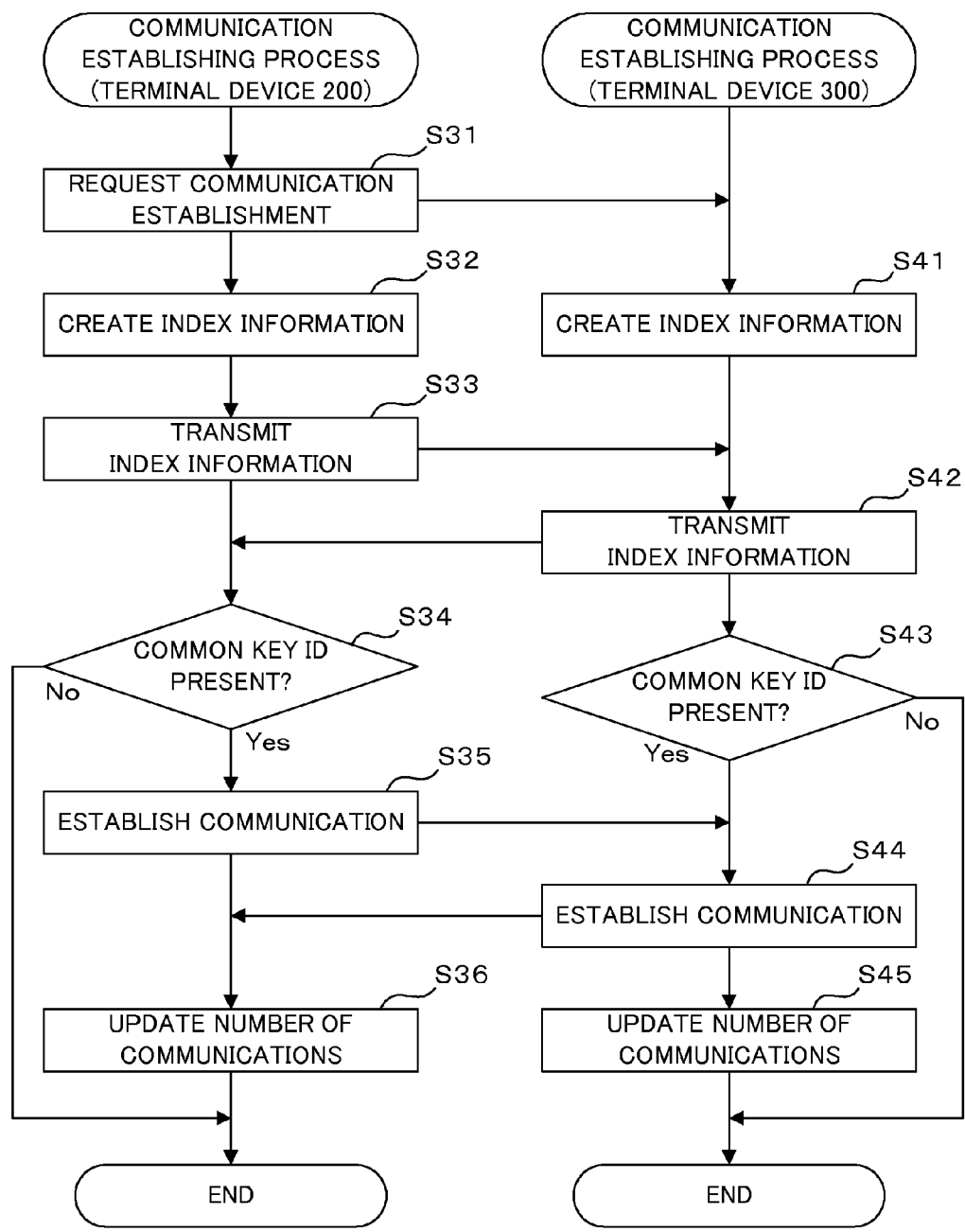
FIG. 10 is a flowchart for explaining a communication establishing process executed by the two terminal devices.
Figure 11:
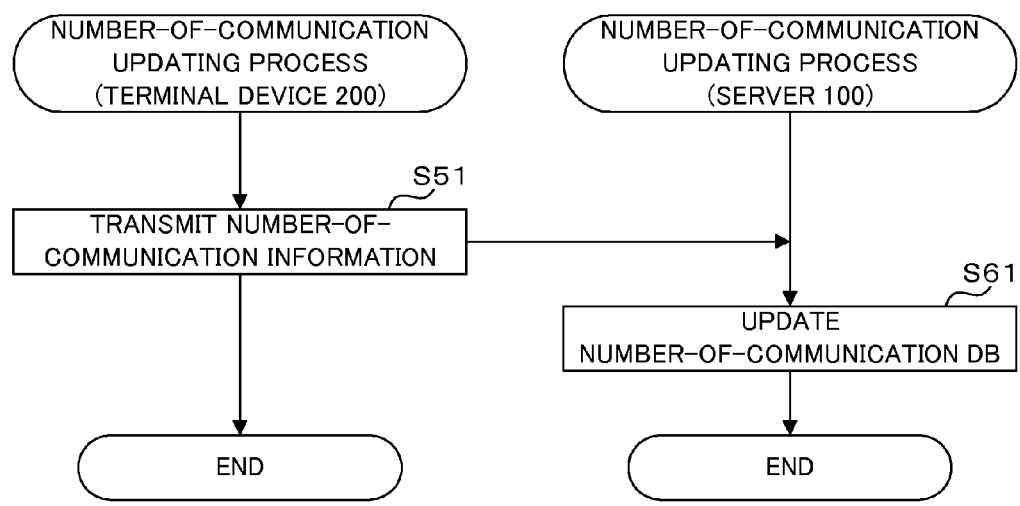
FIG. 11 is a flowchart for explaining a number-of-communication updating process executed by the server and the terminal device.

Next, an explanation will be given of the communication establishing process when wireless communication is performed over an ad-hoc network between the terminal devices 200 to 400. The following explanation will be given of an example case in which the terminal device 200 and the terminal device 300 perform wireless communication with reference to the flowchart of FIG. 10.

For example, the communication establishing process is started upon reception of an instruction for performing wireless communication over the ad-hoc network given by the user from the input device 230 of the terminal device 200.

The controller 240 transmits a communication establishing request to the terminal device 300 (step S31).

The controller 240 creates index information containing M number of key IDs stored in the key DB 211 (step S32). Moreover, the terminal device 300 that has received the communication establishing request also creates index information (step S41) likewise the terminal device 200.

The controller 240 transmits the index information created in the step S32 to the terminal device 300 (step S33). Likewise, the terminal device 300 transmits the index information created in the step S41 to the terminal device 200 (step S42).

The controller 240 compares the index information received from the terminal device 300 with the index information locally stored, and determines whether or not there is a common key ID (step S34). Likewise, the terminal device 300 compares the index information received from the terminal device 200 with the index information locally stored, and determines whether or not there is a common key ID (step S43). When determining that there is no common key ID (step S34: NO, step S43: NO), the controller 240 and the terminal device 300 terminate the communication establishing process.

When determining that there is a common key ID (step S34: YES), the controller 240 establishes a communication path with the terminal device 300 using the key corresponding to that common key ID (step S35). Likewise, when determining that there is a common key ID (step S43: YES), the terminal device 300 establishes a communication path with the terminal device 200 using the key corresponding to that common key ID (step S44). Conventionally well-known techniques like a challenge-response authentication typical of the authentication technique and a symmetrical key cryptography typical of the encryption technique can be applied as the technologies of establishing the communication at this time.

Next, the controller 240 updates the number of communications of the key ID used for establishing the communication path in the step S35 in the number-of-communication DB 212 stored in the local storing device 210 (step S36). Likewise, the terminal device 300 updates the number of communications of the key ID used for establishing the communication path in the step S44 in the number-of-communication DB stored in the local storing device (step S45).

Thereafter, the terminal device 200 and the terminal device 300 complete the communication establishing process.

Next, an explanation will be given of a number-of-communication updating process between the terminal device 200 to 400 and the server 100. The following explanation will be given of an example case in which the number-of-communication updating process is executed between the terminal device 200 and the server 100, but the same process is also executed between the terminal device 300 or 400 and the server 100.

For example, the terminal device 200 determines whether or not to be connectable with the server 100 for each predetermined time, and the number-of-communication updating process is started upon determination that it is connectable.

The terminal device 200 transmits the number-of-communication information stored in the number-of-communication DB 212 in the storing device 210 to the server 100 (step S51).

The server 100 updates the number-of-communication information of the terminal device 200 in the number-of-communication DB 112 with the number-of-communication information transmitted from the terminal device 200 in the step S51 (step S61).

Next, the terminal device 200 and the server 100 complete the number-of-communication updating process.

As explained above, in the key distribution system 1 of this embodiment, the server 100 distributes, to the terminal device of the user, the key highly possibly shared by the terminal device having the desired attribute by the user as the communication counterparty. Hence, a safe communication path can be established over an ad-hoc network with the desired terminal device with a little memory capacity.

Modified Examples

The present invention is not limited to the above-explained embodiment, and various modifications and applications can be made.

In the above-explained embodiment, the explanation was given of the example case in which the repetition of the communication is managed in association with the terminal device and the key. In the present invention, the repetition of the communication may be managed in association with the terminal device. An explanation will be below given of an example case in which the repetition of the communication is managed in association with the terminal device. In the following explanation, the explanation of the same component and process as those of the above-explained embodiment will be omitted or simplified, and the difference from the above-explained embodiment will be mainly explained.

Figure 12:
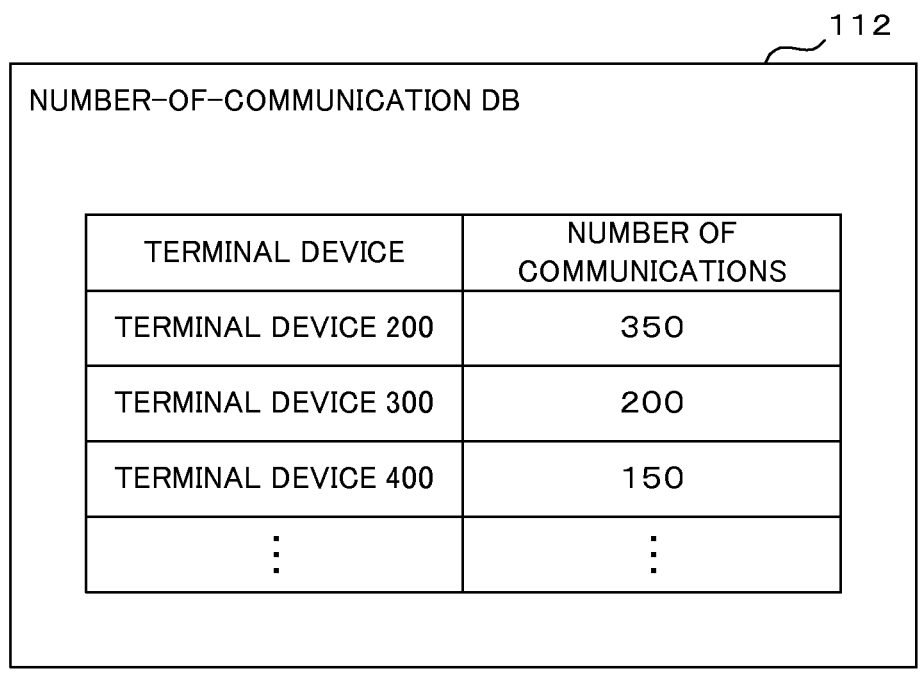
FIG. 12 is an exemplary diagram illustrating an example number-of-communication DB of a server included in a key distribution system according to a modified example.

First, the respective terminal devices 200 to 400 store a number of communications performed using any of the keys in the number-of-communication DB 212 or the like. Next, the communicator 220 of each terminal device 200 to 400 uploads this number of communication to the communicator 120 of the server 100. Conversely, the number-of-communication updater 132 updates the communication DB 112 based on the uploaded number of communications. FIG. 12 illustrates how the number of communications are stored in the number-of-communication DB 112 of the server 100 in association with the respective terminal devices 200 to 400.

Conversely, the key distributer 131 refers to, for example, the number of communications stored in the number-of-communication DB 112, and selects the predetermined number of terminal devices 200 to 400 in an order of a higher communication repetition among the terminal devices 200 to 400 having the same attribute value as the obtained attribute value. Next, the key distributer 131 selects m number of keys at random, and repeats, by a predetermined number of times, a process of obtaining the posterior probabilities $P(m)$ that the m number of keys are stored in the selected predetermined number of terminal devices 200 to 400. Subsequently, the key distributer 131 specifies a combination of the m number of keys that maximizes the obtained posterior probability $P(m)$. The key distributer 131 transmits m number of keys configuring the specified combination to the respective terminal devices 200 to 400.

As explained above, if the key distributer 131 preferentially selects the key stored in the terminal devices 200 to 400 having a relatively large number of communications, when the terminal devices 200 to 400 to which the key has been distributed attempt to establish a communication, the establishment of the communication is successfully facilitated. This is because the terminal device 200 to 400 having the larger past results of the number of communications is highly possibly selected as the communication counterparty of the terminal device 200 to 400 that has requested the distribution of the key.

Moreover, in the above-explained embodiment, when, for example, the number of communications is updated through the communication establishing process, the number of communication is counted as one communication every time a communication is established, but how to count the number of communications is not limited to this scheme. For example, the number of communications can be counted based on a unit of counting that is a communication volume or a communication time.

Furthermore, in the key distributing process of the above-explained embodiment, the key distributer 131 extracts the active key and the non-active key through a comparison between the number of communications and the threshold. However, how to extract the active key and the non-active key is not limited to this scheme, and a key stored in the terminal device having a relatively large communication repetition may be extracted as an active key, while a key stored in the terminal device having a relatively low communication repetition may be extracted as a non-active key. For example, those keys may be extracted with the percentage of the number of communications with each terminal device relative to the total of the number of communications with all terminal devices being as a communication repetition. More specifically, the key distributer 131 may calculate, for the number-of-communication information stored in the number-of-communication DB 112 and of the terminal device having the same attribute value as the attribute value obtained from the terminal devices 200 to 400, the percentage of the number of communications based on the number of communications associated with the obtained m number of key IDs, and may obtain a key having the percentage of the number of communications larger than a predetermined value as an "active key" and a key having the percentage of the number of communications equal to or smaller than the predetermined value as a "non-active key".

The key distribution system according to the embodiment of the present invention can be realized by not only exclusive devices but also a general computer system. When, for example, a program stored in a medium (for example, flexible disk, CD-ROM, or DVD-ROM) storing that program for executing the above-explained processes may be installed in a computer having, for example, a network card, a key storing system that executes the above-explained processes can be configured in advance.

The scheme of supplying the program to a computer is optional. For example, such a program may be supplied through, for example, a communication line, a communication network, or a communication system. As an example, the program is posted on a bulletin board (BBS) over a communication network, and is distributed in a manner superimposed on carrier waves through the network. This enables the execution of the above-explained processes.

The present invention allows various embodiments and modifications without departing from the broadest scope and spirit of the present invention. The above-explained embodiment is to explain the present invention, and is not to limit the scope of the present invention. That is, the scope of the present invention should be defined by the appended claims rather than the embodiment of the present invention. Various modifications carried out within the range of the appended claims and the range equivalent thereto should be within the scope of the present invention.

A part of or all portions of the above-explained embodiment can be described as the following additional notes, but the present invention is not limited to the following additional notes.

(Additional Note 1)

A key distribution system including:

a plurality of wireless communication terminal devices that includes a first wireless communication terminal device and a second wireless communication terminal device constructing an ad-hoc network; and a server that distributes, to the plurality of wireless communication terminal devices, a key for encrypting information transmitted by the plurality of wireless communication terminal devices with each other over the ad-hoc network, the first wireless communication terminal device including an attribute value transmitter that transmits an attribute value of the second wireless communication terminal device to the server, and the server including:

a key managing information storage that stores attribute values of the plurality of wireless communication terminal devices and a plurality of keys in association with each other; and a key distributer which obtains, from the key managing information storage, a plurality of keys corresponding to an attribute value transmitted by the attribute value transmitter, obtains a predetermined number of keys maximizing a posterior probability of, among the plurality of obtained keys, the key being stored in a plurality of wireless communication terminal devices having a same attribute value as the attribute value transmitted by the attribute value transmitter and having a communication repetition larger than a predetermined value among the plurality of wireless communication terminal devices, and transmits the predetermined number of obtained keys to the first wireless communication terminal devices.

(Additional Note 2)

The key distribution system of the additional note 1, in which the server further includes a number-of-communication storage that stores the plurality of wireless communication terminal devices and numbers of communications performed by the plurality of wireless communication terminal devices using any of the plurality of stored keys in association with each other, and the key distributer obtains, from the number-of-communication storage, the number of communications corresponding to a plurality of wireless communication terminal devices having a same attribute value as the attribute value transmitted by the attribute value transmitter, and obtains the communication repetition based on the obtained numbers of communications.

(Additional Note 3)

The key distribution system of additional note 2, in which the first wireless communication terminal device further includes a number-of-communication transmitter that transmits number-of-communication information containing a number of communications performed using the key transmitted by the key distributer to the server, and the server further includes a number-of-communication updater that updates information stored in the number-of-communication storage based on the number-of-communication information transmitted by the number-of-communication transmitter.

(Additional Note 4)

The key distribution system of additional note 2 or 3, in which the key distributer:

selects, from the plurality of obtained keys at random, m number of keys that is sufficiently smaller number than a number n of the plurality of keys obtained from the key managing information storage;

calculates a posterior probability P(m) that the selected m number of keys are stored in a plurality of wireless communication terminal devices which have a same attribute value as the attribute value transmitted by the attribute value transmitter, and which have a communication repetition performed using any of the plurality of stored keys larger than a predetermined value; and transmits m number of keys that maximize the calculated posterior probability P(m) to the first wireless communication terminal device.

(Additional Note 5)

The key distribution system of additional note 1, in which the server further includes a number-of-communication storage that stores, in association with each other, the plurality of wireless communication terminal devices, the plurality of stored keys, and a number of communications performed by the plurality of wireless communication terminal devices using each of the plurality of stored keys, and the key distributer obtains, from the number-of-communication storage, a number of communications corresponding to the plurality of keys obtained from the key managing information storage and the plurality of wireless communication terminal devices having a same attribute value as the attribute value transmitted by the attribute value transmitter, and obtains the communication repetition based on the obtained number of communications.

(Additional Note 6)

The key distribution system of additional note 5, in which the first wireless communication terminal device further includes a number-of-communication transmitter that transmits number-of-communication information containing the key transmitted from the key distributer and a number of communications performed using the key to the server, and the server further includes a number-of-communication updater that updates information stored in the number-of-communication storage based on the number-of-communication information transmitted by the number-of-communication transmitter.

(Additional Note 7)

The key distribution system of additional note 5 or 6, wherein the key distributer:

selects, from the plurality of obtained keys at random, m number of keys that is sufficiently smaller number than a number n of the plurality of keys obtained from the key managing information storage;

calculates a posterior probability P(m) that the selected m number of keys are stored in a plurality of wireless communication terminal devices which have a same attribute value as the attribute value transmitted by the attribute value transmitter, and which have a communication repetition performed using the m number of keys larger than a predetermined value; and transmits m number of keys that maximize the calculated posterior probability P(m) to the first wireless communication terminal device.

(Additional Note 8)

The key distribution system of additional note 4 or 7, in which the first wireless communication terminal device:

further includes a key storage that stores the m number of keys transmitted by the key distributer;

exchanges index information containing identification information of the m number of keys stored in the key storage with the second wireless communication terminal device; and establishes a communication path with the second wireless communication terminal device using a key corresponding to common identification information when determining that the index information obtained from the second wireless communication terminal device contains the common identification information to the identification information of the m number of the keys stored in the storage.

(Additional Note 9)

A key distribution method for distributing a key for encrypting information transmitted by a plurality of wireless communication terminal devices with each other over an ad-hoc network, to the plurality of wireless communication terminal devices including a first wireless communication terminal device and a second wireless communication terminal device, the method including steps of:

obtaining, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device;

obtaining, among the plurality of keys obtained through the step of obtaining the plurality of keys, a predetermined number of keys that maximize a posterior probability that the keys are stored in a plurality of wireless communication terminal devices having a same attribute value as the attribute value of the second wireless communication terminal device and having a communication repetition larger than a predetermined value; and transmitting the predetermined number of keys obtained through the step of obtaining the predetermined number of keys to the first wireless communication terminal device.

(Additional Note 10)

A recording medium having stored therein a program executed by a computer that distributes a key for encrypting information transmitted by a plurality of wireless communication terminal devices with each other over an ad-hoc network, to the plurality of wireless communication terminal devices including a first wireless communication terminal device and a second wireless communication terminal device, the program causing the computer to function as:

an attribute-value-corresponding-key obtainer that obtains, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device;

a predetermined-number-of-key obtainer that obtains, among the plurality of keys obtained by the attribute-value-corresponding-key obtainer, a predetermined number of keys that maximize a posterior probability that the keys are stored in a plurality of wireless communication terminal devices having a same attribute value as the attribute value of the second wireless communication terminal device and having a communication repetition larger than a predetermined value; and a key transmitter that transmits the predetermined number of keys obtained by the predetermined-number-of-key obtainer to the first wireless communication terminal device.

The present invention is based on Japanese Patent Application No. 2011-77316 filed on Mar. 31, 2011. The entire specification, claims and drawings of Japanese Patent Application No. 2011-77316 are herein incorporated in this specification by reference.

INDUSTRIAL APPLICABILITY

The present invention is applicable to systems that encrypt information and perform communication.

DESCRIPTION OF REFERENCE NUMERALS

1 Key distribution system
100 Server
110 Storing device
111 Key managing information DB
112 Number-of-communication DB
113 Attribute information DB
120 Communicator
130 Controller
131 Key distributer
132 Number-of-communication updater
200 to 400 Terminal device
210 Storing device
211 Key DB
212 Number-of-communication DB
220 Communicator
230 Input device
240 Controller
500 Network

The invention claimed is:

1. A key distribution system comprising: a plurality of wireless communication terminal devices that includes a first wireless communication terminal device and a second wireless communication terminal device constructing an ad-hoc network; and a server that distributes, to the plurality of wireless communication terminal devices, a key for encrypting information transmitted by the plurality of wireless communication terminal devices with each other over the ad-hoc network, the first wireless communication terminal device comprising an attribute value transmitter that transmits an attribute value of the second wireless communication terminal device to the server, and the server comprising:

a key managing information storage that stores attribute values of the plurality of wireless communication terminal devices and a plurality of keys in association with each other; and a key distributer which obtains, from the key managing information storage, a plurality of keys corresponding to an attribute value transmitted by the attribute value transmitter, obtains a predetermined number of keys maximizing a posterior probability of, among the plurality of obtained keys, the keys being stored in a plurality of wireless communication terminal devices having a same attribute value as the attribute value transmitted by the attribute value transmitter and having a communication repetition larger than a predetermined value among the plurality of wireless communication terminal devices, and transmits the predetermined number of obtained keys to the first wireless communication terminal device;

wherein the key distributor further:

selects, from the plurality of obtained keys at random, m number of keys that is sufficiently smaller number than a number n of the plurality of keys obtained from the key managing information storage, and calculates a posterior probability P(m) that the selected m number of keys are stored in a plurality of wireless communication terminal devices which have a same attribute value as the attribute value transmitted by the attribute value transmitter, and which have a communication repetition performed using any of the plurality of stored keys larger than a predetermined value.

2. The key distribution system according to claim 1, wherein the server further comprises a number-of-communication storage that stores the plurality of wireless communication terminal devices and numbers of communications performed by the plurality of wireless communication terminal devices using any of the plurality of stored keys in association with each other, and the key distributer obtains, from the number-of-communication storage, the number of communications corresponding to a plurality of wireless communication terminal devices having a same attribute value as the attribute value transmitted by the attribute value transmitter, and obtains the communication repetition based on the obtained numbers of communications.

3. The key distribution system according to claim 2, wherein the first wireless communication terminal device further comprises a number-of-communication transmitter that transmits number-of-communication information containing a number of communications performed using the key transmitted by the key distributer to the server, and the server further comprises a number-of-communication updater that updates information stored in the number-of-communication storage based on the number-of-communication information transmitted by the number-of-communication transmitter.

4. The key distribution system according to claim 2, wherein the key distributer further:
transmits m number of keys that maximize the calculated posterior probability P(m) to the first wireless communication terminal device.

5. The key distribution system according to claim 1, wherein
the server further comprises a number-of-communication storage that stores, in association with each other, the plurality of wireless communication terminal devices, the plurality of stored keys, and a number of communications performed by the plurality of wireless communication terminal devices using each of the plurality of stored keys, and
the key distributer obtains, from the number-of-communication storage, a number of communications corresponding to the plurality of keys obtained from the key managing information storage and the plurality of wireless communication terminal devices having a same attribute value as the attribute value transmitted by the attribute value transmitter, and obtains the communication repetition based on the obtained number of communications.

6. The key distribution system according to claim 5, wherein
the first wireless communication terminal device further comprises a number-of-communication transmitter that transmits number-of-communication information containing the key transmitted from the key distributer and a number of communications performed using the key to the server, and
the server further comprises a number-of-communication updater that updates information stored in the number-of-communication storage based on the number-of-communication information transmitted by the number-of-communication transmitter.

7. The key distribution system according to claim 5, wherein the key distributer:
selects, from the plurality of obtained keys at random, m number of keys that is sufficiently smaller number than a number n of the plurality of keys obtained from the key managing information storage;
calculates a posterior probability P(m) that the selected m number of keys are stored in a plurality of wireless communication terminal devices which have a same attribute value as the attribute value transmitted by the attribute value transmitter, and which have a communication repetition performed using the m number of keys larger than a predetermined value; and
transmits m number of keys that maximize the calculated posterior probability P(m) to the first wireless communication terminal device.

8. The key distribution system according to claim 4, wherein the first wireless communication terminal device:
further comprises a key storage that stores the m number of keys transmitted by the key distributer;
exchanges index information containing identification information of the m number of keys stored in the key storage with the second wireless communication terminal device; and
establishes a communication path with the second wireless communication terminal device using a key corresponding to common identification information when determining that the index information obtained from the second wireless communication terminal device contains the common identification information to the identification information of the m number of the keys stored in the storage.

9. The key distribution system according to claim 7, wherein the first wireless communication terminal device:
further comprises a key storage that stores the m number of keys transmitted by the key distributer;
exchanges index information containing identification information of the m number of keys stored in the key storage with the second wireless communication terminal device; and
establishes a communication path with the second wireless communication terminal device using a key corresponding to common identification information when determining that the index information obtained from the second wireless communication terminal device contains the common identification information to the identification information of the m number of the keys stored in the storage.

10. A key distribution method for distributing a key for encrypting information transmitted by a plurality of wireless communication terminal devices with each other over an ad-hoc network, to the plurality of wireless communication terminal devices including a first wireless communication terminal device and a second wireless communication terminal device, the method comprising steps of:
obtaining, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device;
obtaining, among the plurality of keys obtained through the step of obtaining the plurality of keys, a predetermined number of keys that maximize a posterior probability that the keys are stored in a plurality of wireless communication terminal devices having a same attribute value as the attribute value of the second wireless communication terminal device and having a communication repetition larger than a predetermined value;
transmitting the predetermined number of keys obtained through the step of obtaining the predetermined number of keys to the first wireless communication terminal device;
selecting, from the plurality of obtained keys at random, m number of keys that is sufficiently smaller than a number n of the plurality of keys obtained from the key managing information storage; and
calculating a posterior probability P(m) that the selected m number of keys are stored in a plurality of wireless communication terminal devices which have a same attribute value as the attribute value of the second wireless communication terminal device and which have a communication repetition performed using any of the plurality of stored keys larger than a predetermined value.

11. A non-transitory computer-readable recording medium having stored therein a program executed by a computer that distributes a key for encrypting information transmitted by a plurality of wireless communication terminal devices with each other over an ad-hoc network, to the plurality of wireless communication terminal devices including a first wireless communication terminal device and a second wireless communication terminal device, the program causing the computer to perform a method comprising:

obtaining, from a key managing information storage that stores attribute values of the plurality of wireless communication terminal devices and a plurality of keys in association with each other, a plurality of keys corresponding to an attribute value of the second wireless communication terminal device obtained from the first wireless communication terminal device;

obtaining, among the plurality of keys obtained by the attribute-value-corresponding-key obtainer, a predetermined number of keys that maximize a posterior probability that the keys are stored in a plurality of wireless communication terminal devices having a same attribute value as the attribute value of the second wireless communication terminal device and having a communication repetition larger than a predetermined value;

transmitting the predetermined number of keys obtained through the step of obtaining the predetermined number of keys to the first wireless communication terminal device;

selecting, from the plurality of obtained keys at random, m number of keys that is sufficiently smaller than a number n of the plurality of keys obtained from the key managing information storage; and calculating a posterior probability $P(m)$ that the selected m number of keys are stored in a plurality of wireless communication terminal devices which have a same attribute value as the attribute value of the second wireless communication terminal device and which have a communication repetition performed using any of the plurality of stored keys larger than a predetermined value.

* * * * *

UNITED STATES PATENT AND TRADEMARK OFFICE
CERTIFICATE OF CORRECTION

PATENT NO. : 8,923,518 B2  
APPLICATION NO. : 13/882303  
DATED : December 30, 2014  
INVENTOR(S) : Jun Noda Page 1 of 1

It is certified that error appears in the above-identified patent and that said Letters Patent is hereby corrected as shown below:

In the specification

Column 7, Line 18: delete " $\dfrac{\dfrac{A}{A \times B} \times \dfrac{x}{A}}{\dfrac{A}{A \times B} \times \dfrac{x}{A} + \dfrac{B}{A+B} \times \dfrac{y}{B}}$ " and insert -- $\dfrac{\dfrac{A}{A+B} \times \dfrac{x}{A}}{\dfrac{A}{A+B} \times \dfrac{x}{A} + \dfrac{B}{A+B} \times \dfrac{y}{B}}$ --

Signed and Sealed this  
Sixth Day of October, 2015

Michelle K. Lee  
*Director of the United States Patent and Trademark Office*